(12) United States Patent
Chen et al.

(10) Patent No.: US 6,956,836 B2
(45) Date of Patent: Oct. 18, 2005

(54) ASYMMETRIC FREQUENCY ALLOCATION FOR PACKET CHANNELS IN A WIRELESS NETWORK

(75) Inventors: Dayong Chen, Cary, NC (US); John Diachina, Garner, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 204 days.

(21) Appl. No.: 09/859,753

(22) Filed: May 17, 2001

(65) Prior Publication Data

US 2002/0172163 A1 Nov. 21, 2002

(51) Int. Cl.[7] .............................. H04L 5/22; H04J 3/16; H04J 4/00; H04B 7/212
(52) U.S. Cl. ..................... 370/330; 370/436; 370/437; 370/348
(58) Field of Search ................................ 370/468, 437, 370/329–330, 336, 343, 347–348, 208, 281, 370/294–5, 436, 337

(56) References Cited

U.S. PATENT DOCUMENTS

| | | | | |
|---|---|---|---|---|
| 5,539,730 | A | * | 7/1996 | Dent .......................... 370/280 |
| 5,778,318 | A | * | 7/1998 | Talarmo et al. .......... 455/452.1 |
| 6,134,227 | A | * | 10/2000 | Magana ...................... 370/330 |
| 6,353,598 | B1 | * | 3/2002 | Baden et al. ............... 370/280 |
| 6,501,745 | B1 | * | 12/2002 | Turina et al. ................ 370/337 |
| 6,535,748 | B1 | * | 3/2003 | Vuorio et al. ............. 455/552.1 |
| 6,542,460 | B1 | * | 4/2003 | Ring .......................... 370/203 |
| 6,553,540 | B1 | * | 4/2003 | Schramm et al. ........... 714/790 |
| 6,804,214 | B1 | * | 10/2004 | Lundh et al. ................ 370/335 |
| 6,891,818 | B1 | * | 5/2005 | Jarvisalo et al. ............ 370/337 |
| 2001/0030956 | A1 | * | 10/2001 | Chillariga et al. .......... 370/348 |
| 2001/0055297 | A1 | * | 12/2001 | Benveniste .................. 370/349 |
| 2002/0041566 | A1 | * | 4/2002 | Yang et al. ................. 370/229 |
| 2002/0159422 | A1 | * | 10/2002 | Li et al. ...................... 370/342 |

FOREIGN PATENT DOCUMENTS

EP 1058412 12/2000

OTHER PUBLICATIONS

Haas, A Capacity Investigation on URTA-TDD Utilising Underused UTRA-FDD Uplink Resources, 1999, Institution of Electrical Engineers, p. 7/1-6.*

"Digital cellular telecommunications system (Phase 2+); General Packet Radio Service (GPRS); Mobile Station (MS)—Base Station System (BSS) interface; Radio Link Control/Medium Access Control (RLC/MAC) protocol (3GPP TS 04.60 version 8.7.0 Release 1999)", ETSI TS 101 349 V8.7.0 (2000-11) Technical Specification (Clause 10), Feb. 13, 2001, pp. 105-122, XP002220543 p. 113, paragraph 10.4.1.

(Continued)

*Primary Examiner*—Chi Pham
*Assistant Examiner*—Ronald Abelson
(74) *Attorney, Agent, or Firm*—Moore & Van Allen PLLC; Steven B. Phillips

(57) ABSTRACT

Asymmetric frequency allocation for packet channels in a wireless network. Asymmetric radio spectrum allocation along with multiple duplex carrier types within a spectrum allocated in uplink and downlink blocks of frequencies provides greater capacity for downlink traffic. Each uplink block of frequencies has multiple associated downlink blocks of frequencies. When the invention is employed for packet channel operations in a TDMA-based network, the base station system can assign timeslots to the mobile station on an asymmetric carrier. The base station system also assigns a flag value to the mobile station for use in packet channel operations. In the case of GSM, the flag is an uplink state flag.

13 Claims, 8 Drawing Sheets

OTHER PUBLICATIONS

"Universal Mobile Telecommunications Systems (UMTS); UE Radio Transmission and Reception (FDD) (3GPP TS 25.101 version 4.0.0 Release 4)", Apr. 23, 2001, pp. 1-68, page 9, paragraph 5 - p. 11.

Haas H. et al., "A capacity investigation on UTRA-TDD utilising underused UTRA-FDD uplink resources", IEE Colloquium on UMTS Terminals and Software Radio, Apr. 26, 1999, pp. 7-1-7-6-6, p. 1, paragraph - p. 2.

* cited by examiner

ASYMMETRIC FREQUENCY ALLOCATION FOR PACKET CHANNELS IN A WIRELESS NETWORK

BACKGROUND OF THE INVENTION

Today's time domain multiplexed access (TDMA) cellular radio systems use frequency division duplex (FDD) to provide simultaneous radio transmission channels between the mobile station and the base station system. In FDD, a pair of simplex, radio frequencies with a fixed and known frequency separation called the duplex distance is used to define a specific duplex carrier or channel in the system. The frequency used to convey traffic to the mobile station from a base station is called the downlink frequency, while the frequency used to carry traffic from the mobile station to the base station is called the uplink frequency. In 900 MHz "Global System for Mobile Communications" (GSM 900) networks, for example, the duplex distance separating the uplink/downlink frequencies of any given channel is 45 MHz. Thus, if $f_u(n)$ is the frequency of the carrier for channel "n" in the uplink spectrum, and $f_d(n)$ is the corresponding frequency in the downlink spectrum, then:

$$f_u(n) = f_0 + B*n \text{ (MHz), and}$$

$$f_d(n) = f_u(n) + 45 \text{ (MHz).}$$

Where, $f_0$ is the carrier frequency associated with the lower edge of the frequency band used for uplink frequencies, and B is the channel spacing. As an example, in GSM 900, $f_0$ is 890 MHz and B is 0.2 MHz.

FIG. 1 is a spectrum diagram that illustrates the above scheme. The channel shown at 101 has an uplink frequency separated by 45 MHz from a downlink frequency. Uplink and downlink frequencies in FDD networks are generally allocated and licensed in frequency blocks where all allocated frequency blocks together comprise an entire band assigned for a given radio technology. For each uplink block of frequencies, there is a corresponding downlink block of frequencies. For example, FIG. 2 illustrates how the uplink and the downlink spectrum are divided into five, 5 MHz blocks for GSM 900. Uplink blocks are denoted as $U^1$–$U^5$ and downlink blocks are denoted as $D^1$–$D^5$, respectively. In most cases, there is more than one operator that has been granted a license to operate a service within the same band. One operator can also have a license to operate multiple block pairs. In the example of FIG. 2, one operator has a license to operate on the block pairs ($U^1$, $D^1$), shown at 201, and ($U^5$, $D^5$), shown at 202.

With the above scheme, the total radio spectrum available is divided equally between the downlink and the uplink. This division can be referred to as symmetric radio frequency allocation. This symmetric radio frequency allocation has been used for circuit-switched applications such as speech that, until now, have been the dominant service provided by wireless service providers. However, the situation is changing dramatically as the mobile Internet emerges. Unlike speech, Internet traffic is mostly asymmetric as the data volume in the downlink direction far exceeds the data volume in the uplink direction. For example, during a World Wide Web (WWW) session, the files sent on the downlink are typically several magnitudes larger than the requests sent on the uplink.

Existing packet radio systems based on TDMA address unequal traffic on the downlink and the uplink by assigning a mobile station more timeslots on the downlink than on the uplink. In many cases, the net result of this asymmetrical timeslot allocation is that downlink frequencies reach full capacity while uplink frequencies are greatly underused.

BRIEF SUMMARY OF THE INVENTION

Downlink traffic capacity is increased during packet operations by reallocating at least one frequency block used for uplink purposes in circuit switched applications to be another downlink frequency block for packet channel operations. This asymmetric frequency allocation creates channels with different duplex distances. Each uplink block of frequencies can have multiple associated downlink blocks of frequencies. An uplink channel can therefore have multiple associated downlink channels. A pair of frequencies within such an asymmetric allocation scheme can be referred to as an asymmetric duplex carrier.

Equipment is programmed to understand the new carrier types with new duplex distances. Typically, base station equipment and some mobile stations include a processor system with memory in which data structures and computer program code are stored with references to which frequencies and frequency blocks are used for uplink and downlink purposes. A base station system according to the invention includes a base station controller and at least one base station transceiver, operatively connected to and controlled by the base station controller. The controller and transceiver both include processing platforms and computer program code, which form the means for transmitting and receiving signals according to the invention. The base station transceiver is operable to receive radio frequency signals modulated with information in at least one uplink block of frequencies, and to transmit radio frequency signals modulated with information on the multiple downlink blocks of frequencies associated with the uplink block of frequencies.

A mobile station that implements the invention includes radio circuitry to transmit and receive radio frequency (RF) signals on frequencies associated with a frequency block as well as logic hardware and/or software connected to the radio circuitry. If the mobile station is a wireless telephone, this logic typically includes baseband logic and control logic. The processor system of the terminal is operatively connected to the logic and controls the logic and the radio circuitry, including memory where program code is stored to control the device. These components form the means for carrying out the invention in a mobile station.

When the invention is employed for packet channel operations in a TDMA-based network, the base station system assigns timeslots to the mobile station on any one of the asymmetric duplex carriers supported. The base station system also assigns a short flag value to the mobile station. When it is time for the mobile station to transmit to the base station system on a timeslot of an uplink frequency, the base station system transmits the flag value on all the downlink frequencies associated with the uplink frequency to indicate to the mobile station that the base station is ready to receive a signal from the mobile station on the uplink frequency. In one embodiment, the base station system transmits the same flag value (USF) on all of the associated downlink frequencies so that all mobiles assigned to the same uplink frequency can "hear" the flag value.

BRIEF DESCRIPTION OF THE DRAWINGS

FIG. 9 is broken apart into FIGS. 9A and 9B for illustrative purposes.

DETAILED DESCRIPTION OF THE INVENTION

The present invention is discussed in terms of the aforementioned Global System for Mobile (GSM) wireless communications standard including the standards for the packet-switched services defined within GSM. These packet switched services include the General Packet Radio Service (GPRS), Enhanced GPRS (EGPRS) and GSM Edge Radio Access Network (GERAN). "Edge" refers to "Enhanced Data Rates for GSM Evolution." GSM is very well known by persons of ordinary skill in the wireless telecommunication arts. GSM is specified and described in a series of standards that are promulgated and published by the European Telecommunications Standards Institute (ETSI). While the present invention may be useful for improving the performance of GSM cellular networks, it should be understood that the principles of the present invention may be applied to any cellular or wireless system utilizing TDMA-based air interfaces, such as the so-called "North American" TDMA standard, "TDMA Cellular PCS," specified in document TIA/EIA-136, Revision B, published Mar. 1, 2000, by the Telecommunications Industry Association (TIA), and the Pacific Digital Cellular (PDC) standard. It should be further understood that the principles of the present invention may be utilized in hybrid systems that are combinations of two or more of the above air interfaces. Furthermore, references to duplex distances, specific frequencies or blocks of frequencies, and the like are made by way of example only.

The present invention provides for asymmetric radio spectrum allocation resulting in multiple duplex carrier types within the spectrum. When applying this invention, utilization of the radio spectrum is greatly improved when engaging in packet channel activities, such as web surfing, where traffic volume on downlink frequencies greatly exceeds that on uplink frequencies. Additionally, an enhanced packet channel operation method is disclosed that allows uplink multiplexing to be used for all of the duplex carrier types. With the invention, the utilization of the existing radio spectrum can be improved with minimal modifications to existing handset and base station technology. Compatibility with existing mobile terminals can also be maintained.

Figure 1:
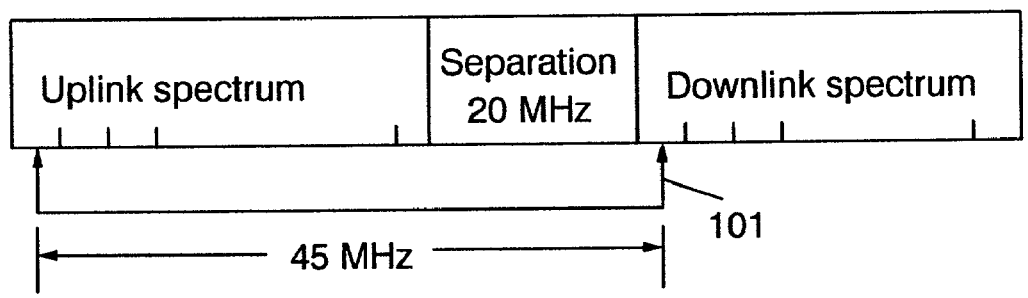
FIG. 1 illustrates the relationship between the uplink spectrum and the downlink spectrum in a symmetric frequency allocation scheme such as that used in GSM 900 radio systems.
Figure 2:
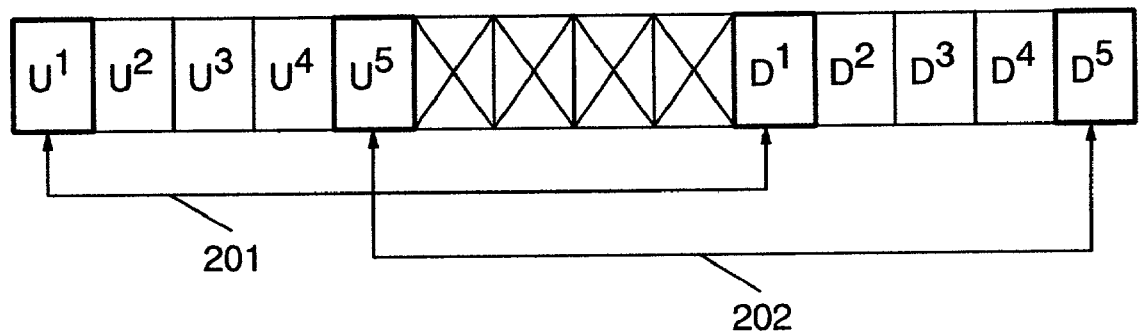
FIG. 2 is a diagram showing uplink and downlink blocks of frequencies in the uplink spectrum and the downlink spectrum in a symmetric frequency allocation scheme such as that used in GSM 900 radio systems.
Figure 3:
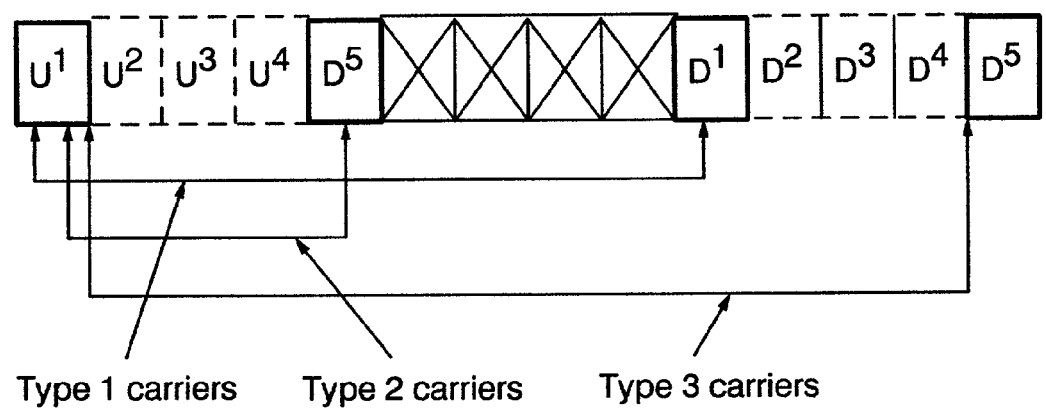
FIG. 3 is a diagram showing uplink and downlink blocks of frequencies allocated according to the asymmetric allocation scheme of the present invention.

Returning to FIG. 2, previously discussed, the operator licensed for uplink and downlink frequency blocks 1 and 5 can increase downlink capacity relative to uplink capacity, according to the invention, by reallocating one of the uplink blocks for downlink use. For example, the operator can reallocate the uplink block $U^5$ shown in FIG. 2 for downlink transmission purposes. In FIG. 3, block $U^5$ is now used for downlink transmission, so it is denoted now as $D^6$. The operator now has 3 downlink blocks, $D^1$, $D^5$, and $D^6$, and 1 uplink block, $U^1$. To create duplex carriers from these frequency blocks, the first carrier in block $D^6$ is associated with the first carrier in block $U^1$, the second carrier in block $D^6$ with the second carrier in block $U^1$, etc., until every frequency in block $D^6$ has been associated with a corresponding frequency in block $U^1$. Note that the duplex distance for all duplex carriers in this group is 20 MHz. In the same way, every carrier frequency in block $D^5$ is associated with a carrier frequency in block $U^1$. For these channels, the duplex distance is 65 MHz. Finally associations between carrier frequencies in block $D^1$ and carrier frequencies in block $U^1$ already exist; these associations correspond to the "classic", GSM, duplex carriers with a duplex distance of 45 MHz.

For purposes of discussion, we refer to a frequency pair by the notation $(f_1,f_2)$ in describing a specific duplex carrier, where $f_1$ represents a frequency for uplink and $f_2$ represents a frequency for downlink. Thus, $(f_{u1},f_{d1})$ represents a duplex carrier that has its uplink in frequency block $U^1$ and its downlink in frequency block $D^1$. We refer to the set of all carriers that have their uplink and downlink frequencies in specific blocks by a notation like $(U^1,D^1)$, which denotes the set of all carriers with an uplink frequency in block $U^1$ and a downlink frequency in block $D^1$. Using this notation, the frequency allocation scheme in FIG. 3 can be described as having three carrier types, with a specific duplex distance associated with each carrier type:

Type 1 carrier: $(f_{u1}, f_{d1}) \in (U^1,D^1)$, duplex distance=45 MHz;

Type 2 carrier: $(f_{u1}, f_{d6}) \in (U^1,D^6)$, duplex distance=20 MHz;

Type 3 carrier: $(f_{u1}, f_{d5}) \in (U^1,D^5)$, duplex distance=65 MHz.

Figure 4:
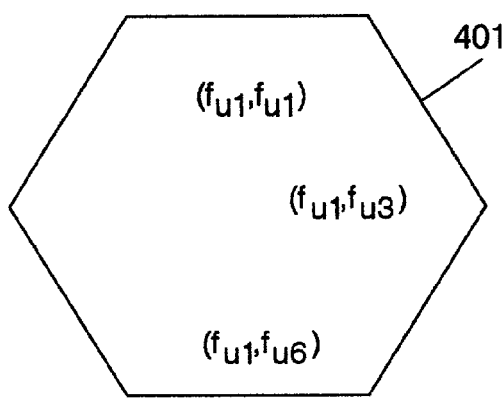
FIG. 4 is a conceptual illustration of a cell in a cellular communication network in which multiple carrier types are in use according to the present invention.

We refer to the type 1 carrier above as the "classic" carrier type, since it has the same duplex distance as specified in the well-known GSM standard. FIG. 4 illustrates how the carrier types in use for a particular cell are denoted. In FIG. 4, cell 401 can assign a mobile station to a carrier according to the scheme just described, so the carrier types, using the above notation are shown in the cell.

Note that it will normally not be practical to assign all mobile stations in a cell to carriers for asymmetric traffic as described above. Even among mobile stations that are engaged in packet data communications, there will be some older mobile stations that are not capable of using carriers with the new duplex distances. Therefore the cell base station system must still be capable of assigning mobile stations to exchange packet data using only classic carriers. Additionally, voice communications will still take place, presenting a demand for symmetric space on uplink and downlink frequencies, even if voice is formatted as data indistinguishable from other forms of data, as in voice-over-IP. In GSM, various types of mobile stations are specified that can communicate via normal voice, packet data, or switch between the two. Some, called "type A" mobile stations can communicate using normal voice and packet data simultaneously, using carrier sets for each. So-called "type B" mobile stations can switch between these two modes automatically, with the base station system and the mobile station saving a context for the packet data channel operation when a user switches to voice in the middle of a packet-switched call. With "type C" mobile stations, only packet-switched calls are possible.

Figure 5:
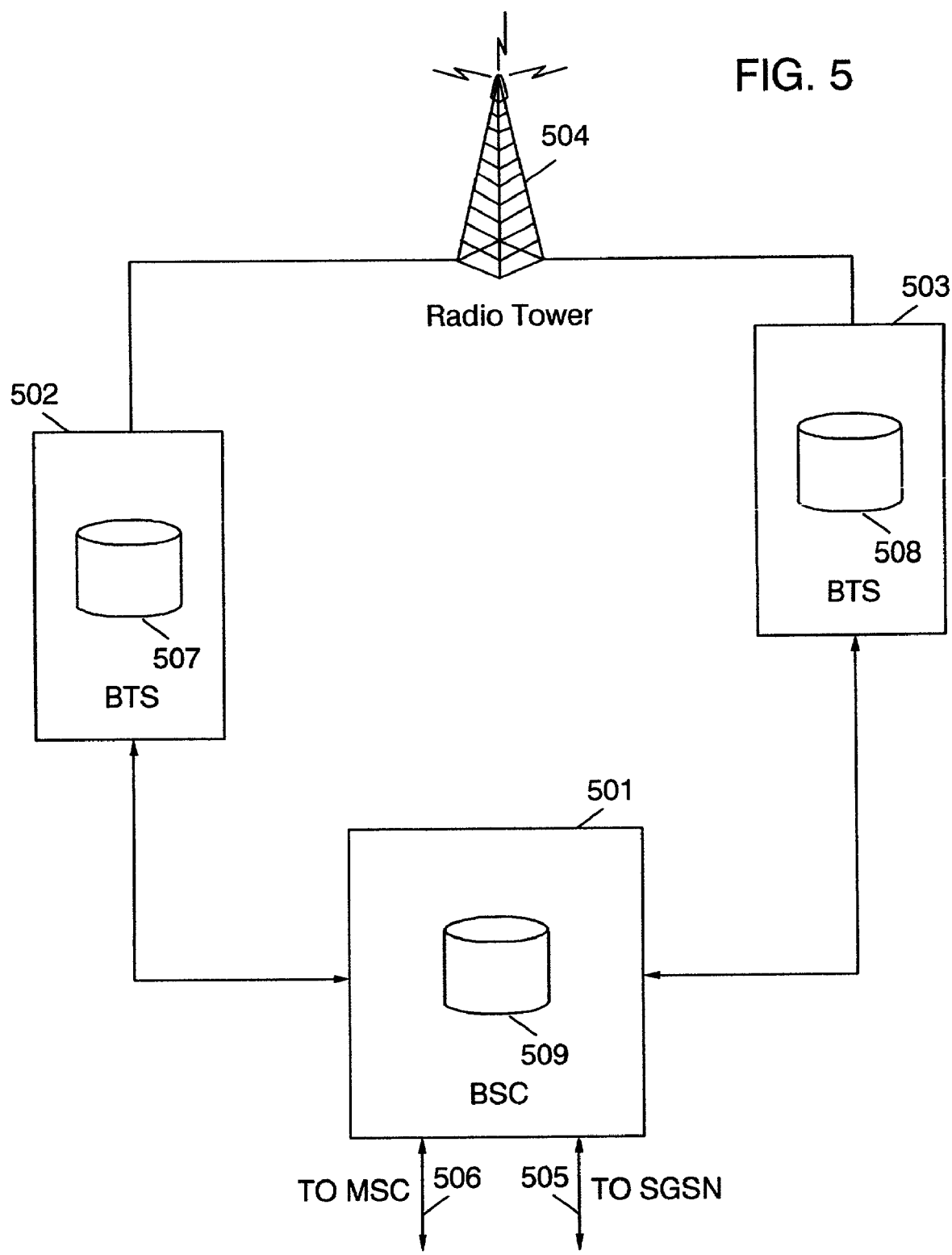
FIG. 5 is a block diagram of a base station system implementing the present invention.

The frequency allocation scheme disclosed above is implemented by programming base station equipment and mobile stations to operate on the new carriers with different duplex distances. A base station system (BSS) that implements the invention is shown in FIG. 5. The exemplary BSS includes base station controller (BSC) 501 and base station transceivers or base transceiver stations (BTS) 502 and 503, each providing service for a single cell through the antenna system 504 of the cell. Each BTS includes transceiver hardware that supports timeslots on uplink and downlink frequencies. The BSC, 501, is linked into the circuit-switched and the packet-switched core network through connections 505 and 506 to a mobile switching center (MSC) and serving GPRS support node (SGSN) respectively (MSC and SGSN not shown). Although only one BSC and two BTS nodes are shown, in practice a system may consist of any number of each node type.

Each BTS has the radio equipment needed to serve one cell, including the radio frequency power amplifiers and all of the digital signal processing equipment needed to operate the cell. The digital signal processing equipment is controlled by computer code, which is stored at and operates each BTS, illustrated as storage 507 and 508. The BSC, 501, is the functional unit that controls and supervises the BTS's and the radio connections in the system, including handoff, traffic channel selection and connection supervision. This is accomplished by means of a control processor (not shown) within the BSC. This processor is also programmed with and controlled by computer program code stored in the BSC, illustrated by storage 509. The invention is implemented in some embodiments by the program code in the BTS's and/or BSC controlling the hardware so that multiple carrier types are used as appropriate. A description of the carrier types and frequency allocation scheme is often stored within the software or memory as a data structure or table.

Figure 6:
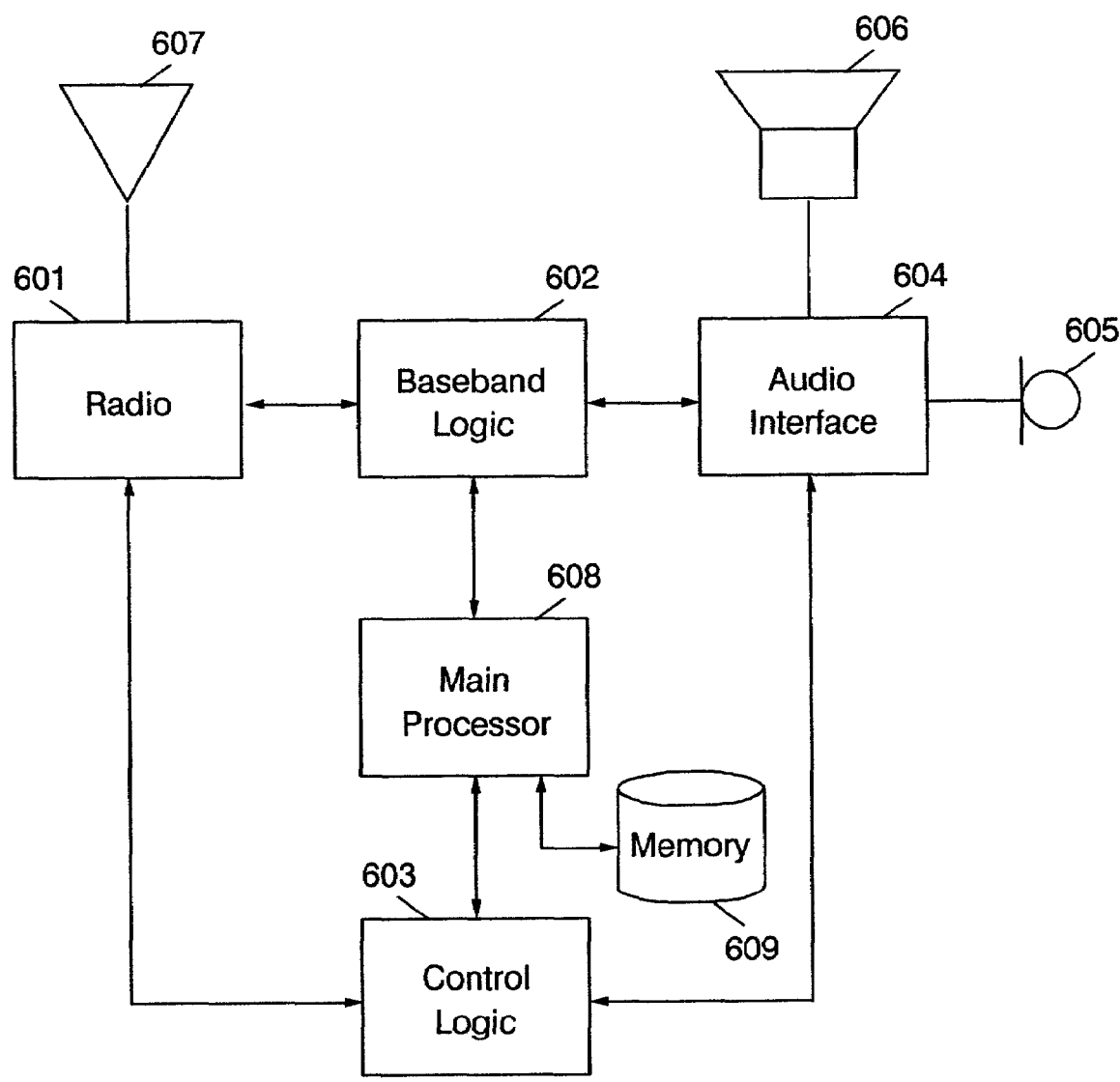
FIG. 6 is a block diagram of an example mobile station implementing one embodiment of the present invention.

FIG. 6 is a block diagram of a mobile station that uses the asymmetric allocation technique of the invention. FIG. 6 illustrates a mobile station with voice capability, such as a mobile telephone that includes packet data capability. This illustration is for example only, and the invention works equally well with mobile stations that are dedicated to communicating text or other forms of data. As shown in FIG. 6, the mobile station includes radio circuitry 601, a baseband logic block, 602, control logic block 603 and an audio interface block, 604. Within radio circuitry 601, the receive and transmit information is converted from and to the radio frequencies (RF) of the various carrier types, and filtering using baseband or intermediate frequency circuitry is applied, as is understood in the art. The antenna system of the mobile station, 607, is connected to the radio circuitry, 601. In baseband logic block 602, basic signal processing occurs, e.g., synchronization, demodulation, channel coding, decoding and burst formatting, as is understood in the art. Audio interface block 604 handles voice as well as analog-to-digital (A/D) and D/A processing. It also receives input through microphone 605, and produces output through speaker 606. Control logic block 603, coordinates the previously described blocks and also plays an important role in controlling the human interface components (not shown) such as a key pad and liquid crystal display (LCD). The functions of the previously described transceiving blocks are directed and controlled by one or more microprocessors or digital signal processors such as main processor 608, shown for illustrative purposes. Program code, often in the form of microcode is stored in memory 609 and controls the operation of the terminal through the processor or processors. Processor 608 and memory 609, are together referred to as a processor system or processor core. The invention is implemented in some embodiments by the program code controlling the hardware so that multiple carrier types are used as appropriate. A description of the carrier types and frequency allocation scheme is often stored within the software or memory as a data structure or table.

While the present invention is described herein in the context of a mobile station similar to a traditional "cellular" telephone, as used herein, the terms "mobile station", "wireless terminal", "wireless communication terminal" and the like are synonymous and may include a cellular radiotelephone with or without a multi-line display; a personal communications system (PCS) terminal that may combine a cellular radiotelephone with data processing, facsimile and data communications capabilities; a personal data assistant (PDA) that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile stations are sometimes also referred to as "pervasive computing" devices.

Packet channel operations for mobile stations are typically defined by the standards that apply to the particular protocols used by the mobile stations, although there are some proprietary packet channel operation methods. The asymmetric frequency allocation of the invention thus far described is compatible with most packet channel operations. For GSM, packet channel operations are described in the standard, GSM 04.60, "Digital Cellular telecommunications system (Phase 2+); General Packet Radio Service (GPRS); Mobile Station (MS)—Base Station System (BSS) interface; Radio Link Control/Medium Access Control (RLC/MAC) protocol," published by ETSI, and related standards published by ETSI, the latest versions of which as of the filing date of this application are incorporated herein by reference and will be further referred to herein as the "GPRS standards." The frequency allocation scheme of the invention is compatible with most of the packet channel operations described in the GPRS, EGPRS and GERAN standards; however, packet channel operations using the dynamic access method described herein may require some extension in order to operate with asymmetric frequency allocation.

Figure 7:
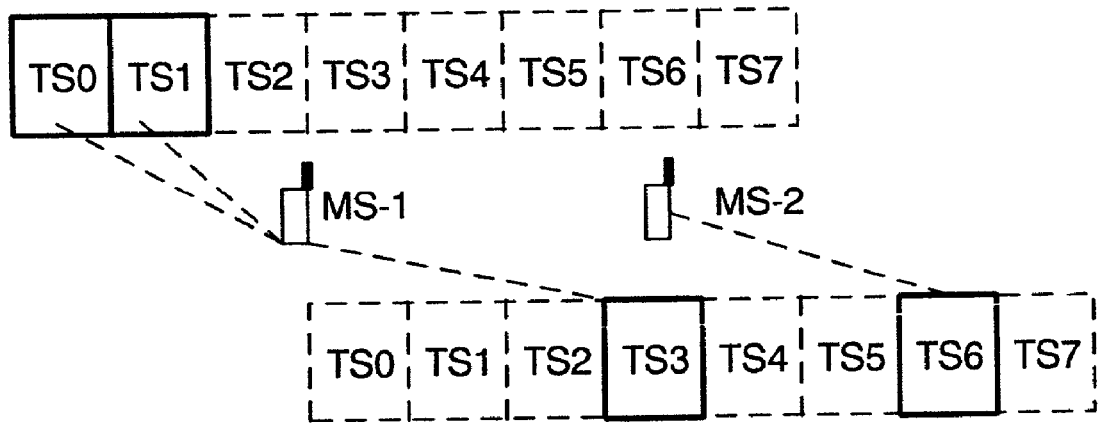
FIG. 7 illustrates an example timeslot assignment in a TDMA based system operating according to the GSM standards.

In a network in which the present invention is employed, the BSS assigns a mobile station one or more packet data channels (PDCH) for user-packet transmission or signaling purposes. A PDCH is a timeslot on either a downlink or uplink carrier frequency. The network assigns uplink and downlink timeslots independently depending on the demand of the mobile station. For example, a mobile station can be assigned several timeslots one the downlink but no timeslot on the uplink. Furthermore, the downlink timeslot(s)

assigned to a mobile station does not need to be the same as the uplink timeslot(s) assigned to the same mobile station. FIG. 7 shows an example timeslot assignment according to the GSM standards where mobile station MS-1 is assigned two downlink timeslots TS0 and TS1 and one uplink timeslot TS3. MS-2 is a mobile station that is assigned only a single uplink timeslot TS6. When the network assigns a mobile station one or more uplink timeslots, it also tells the mobile station how to determine when the mobile station is allowed to transmit on its assigned timeslot(s). The way the mobile station determines when to transmit on an assigned uplink time slot is called the access method, and dynamic access is one method specified in the GPRS standards.

Dynamic access is based on a fixed relationship between an uplink timeslot and an associated downlink timeslot, i.e. the downlink timeslot has the same number as the assigned uplink timeslot. This fixed relationship is the basis of the mechanism used by the network to control when a target mobile station is allowed to transmit on an uplink slot. This fixed relationship exists independent of whether or not the downlink timeslot associated with this fixed relationship has also been assigned to the target or any other mobile station for the purpose of packet data delivery.

Figure 8:
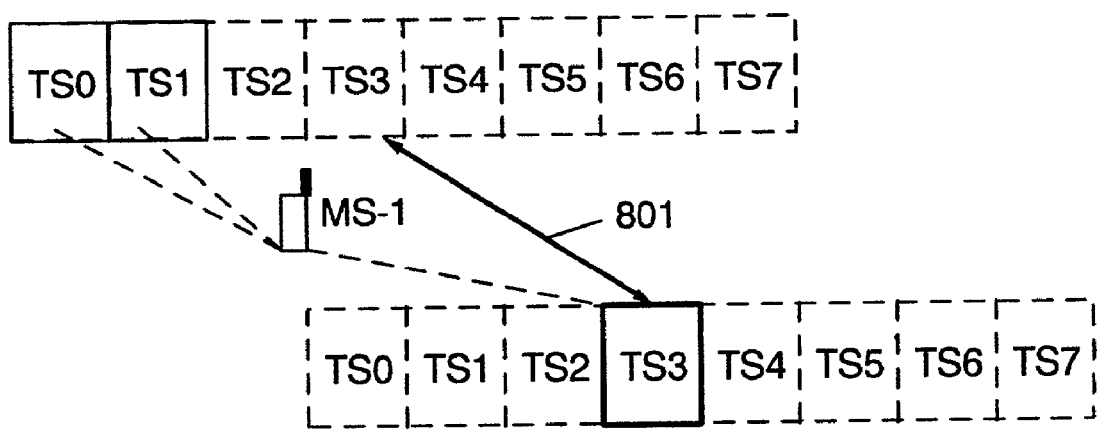
FIG. 8 illustrates the relationship between uplink and downlink timeslots in a TDMA based system using dynamic access according to the GSM standards.

Whenever the BSS assigns an uplink timeslot to a mobile station it also assigns the mobile station an uplink state flag (USF) value. This way, multiple mobile stations can be assigned to the same uplink timeslot where each mobile station has a unique USF value. In GPRS and EGPRS, the USF is three bits, and is allocated using a control message. Three bits allows 8 different flag values, supporting at least 7 mobile stations (one USF value may be reserved for random access). In symmetric frequency allocation systems, the network broadcasts its scheduling of a given uplink timeslot by sending a USF value on the associated downlink timeslot. A mobile station that has been assigned an uplink timeslot constantly monitors the associated downlink timeslot for its assigned USF value. When the mobile station "hears" that the broadcast USF value present in the associated downlink timeslot matches its own USF value, it realizes that it has gained permission to transmit on its assigned uplink timeslot in the next block period. FIG. 8 illustrates dynamic access according to GPRS/EGPRS standards. MS-1 is assigned TS0 and TS1 on the downlink and TS3 on the uplink. Even though the downlink timeslot TS3 is not assigned to any mobile station, the network still sends USF values on TS3 to control mobile station accesses on the assigned uplink timeslot TS3. For access determination purposes, TS3 on the uplink frequency and TS3 on the downlink frequency are associated as shown at 801. The mobile station reads the USF on the downlink timeslot TS3 even though the network sends its downlink traffic on the downlink timeslots TS0 and TS1.

Figure 9A:
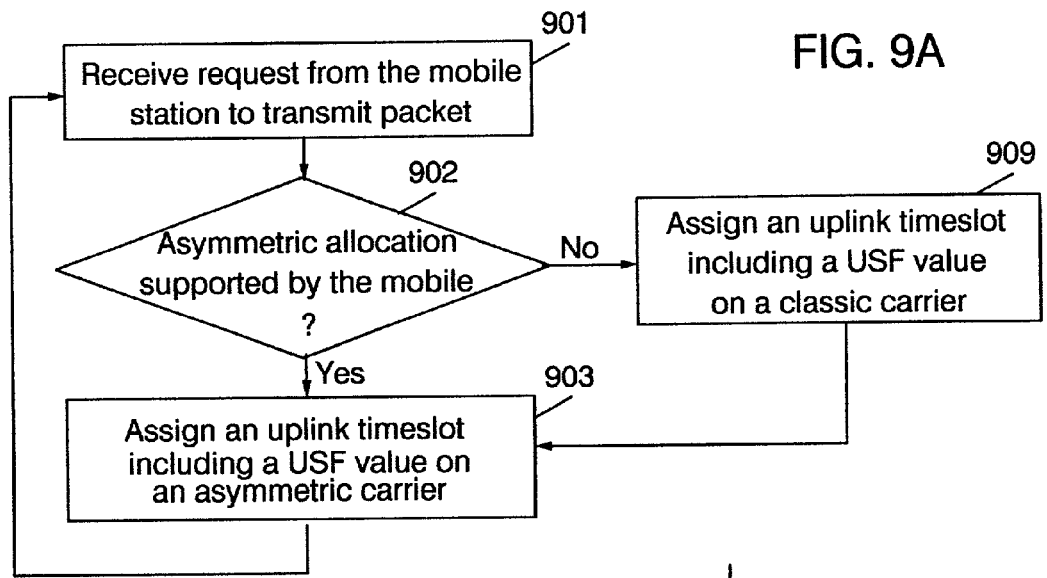
FIG. 9 is a flowchart illustrating the method of communication according to one embodiment of the invention in a base station system.
Figure 9B:
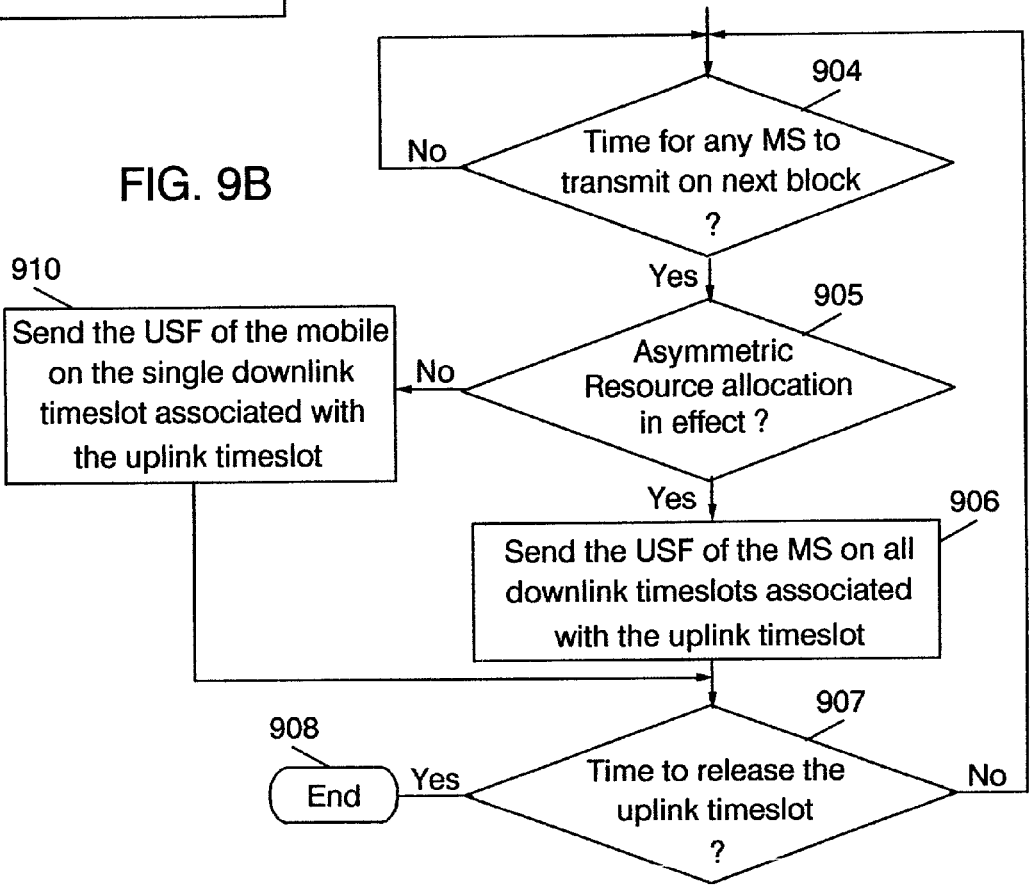
Figure 10:
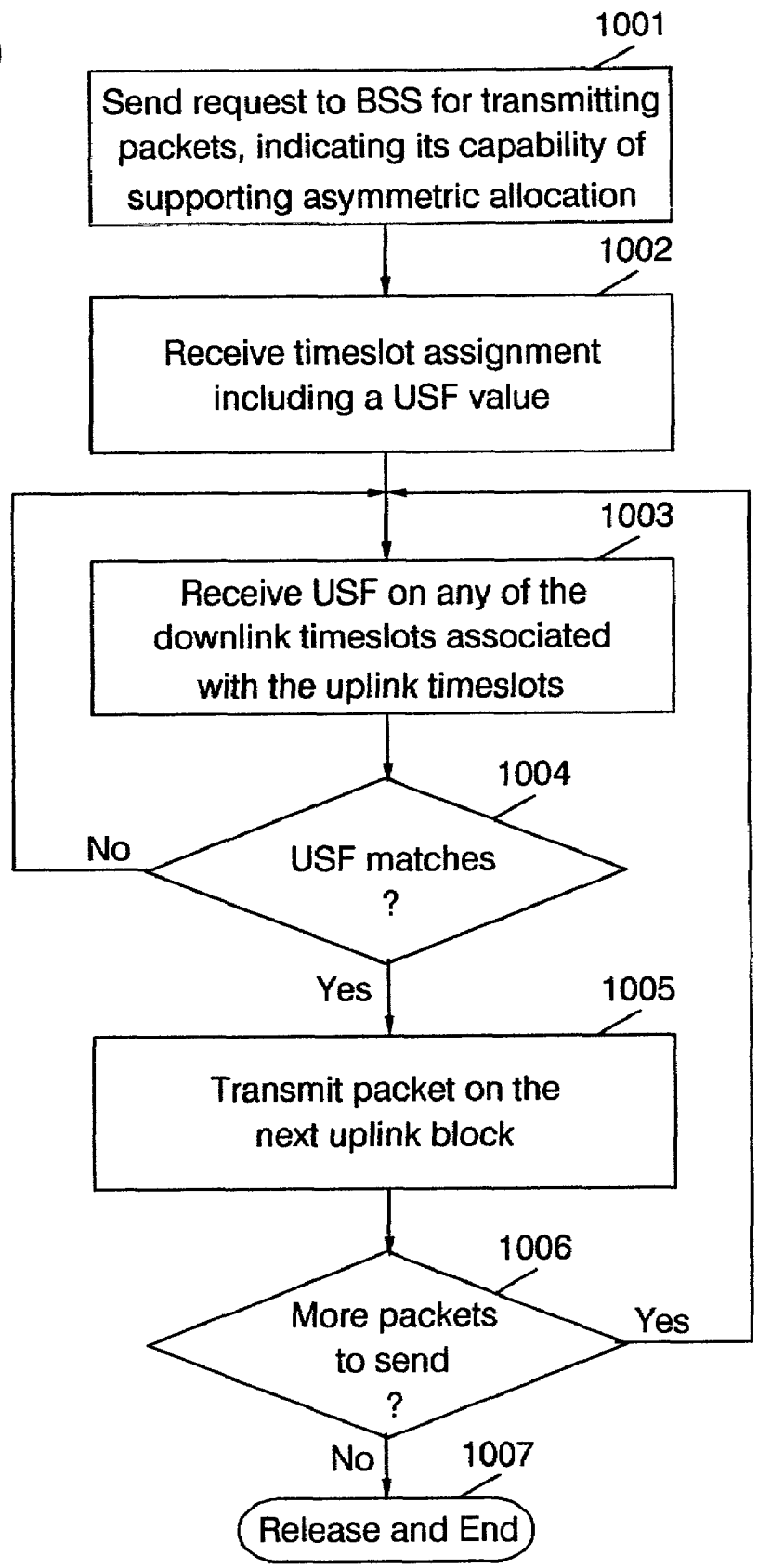
FIG. 10 illustrates the method of communication according to the embodiment of the invention in a mobile station.

FIG. 9 shows a flowchart that illustrates the method of packet channel operation using dynamic access on the BSS where the invention is in use. Two sub-processes that run in parallel are illustrated in FIG. 9, one sub-process (901, 902, 903 and 909), shown as FIG. 9A, handles the assignment of timeslots while the second sub-process (904, 905, 906, 907, 908 and 910), shown as FIG. 9B, decides which MS should transmit in the next block period on the assigned uplink timeslot. FIG. 10 is the corresponding flowchart of packet channel operation on a mobile station where the invention is used. FIG. 9 and FIG. 10 show the packet channel operation on a single timeslot even though the method can be easily applied to the case where more than one timeslot is used. In FIG. 9, at step 901, the first sub-process starts when the base station receives a request from a mobile station to transmit packet data on the uplink. At step 902, the BSS ascertains whether the mobile station supports the asymmetric allocation of the invention. If not, the base station assigns the mobile station an uplink timeslot on a classic carrier at 909. However, if asymmetric frequency allocation is supported, a uplink timeslot is assigned on an asymmetric carrier at step 903. In either case, an unused USF value is assigned to the MS. When step 903 or 909 is completed, the sub-process goes back to step 901 to wait for the next packet transmission request from an MS.

Based on asymmetric radio frequency allocation and using the previous frequency assignment example, each uplink carrier frequency $f_{u1}$ is associated with three downlink carrier frequencies, $f_{d1}$, $f_{d5}$, and $f_{d6}$, where $f_{d1}$, $f_{d5}$, and $f_{d6}$ are taken from blocks $D^1$, $D^5$, and $D^6$, respectively. Thus, each uplink timeslot on $f_{u1}$ is associated with its corresponding downlink timeslot on each of the downlink frequencies, $f_{d1}$, $f_{d5}$, and $f_{d6}$, using an extended, fixed uplink/downlink relationship.

Figure 11:
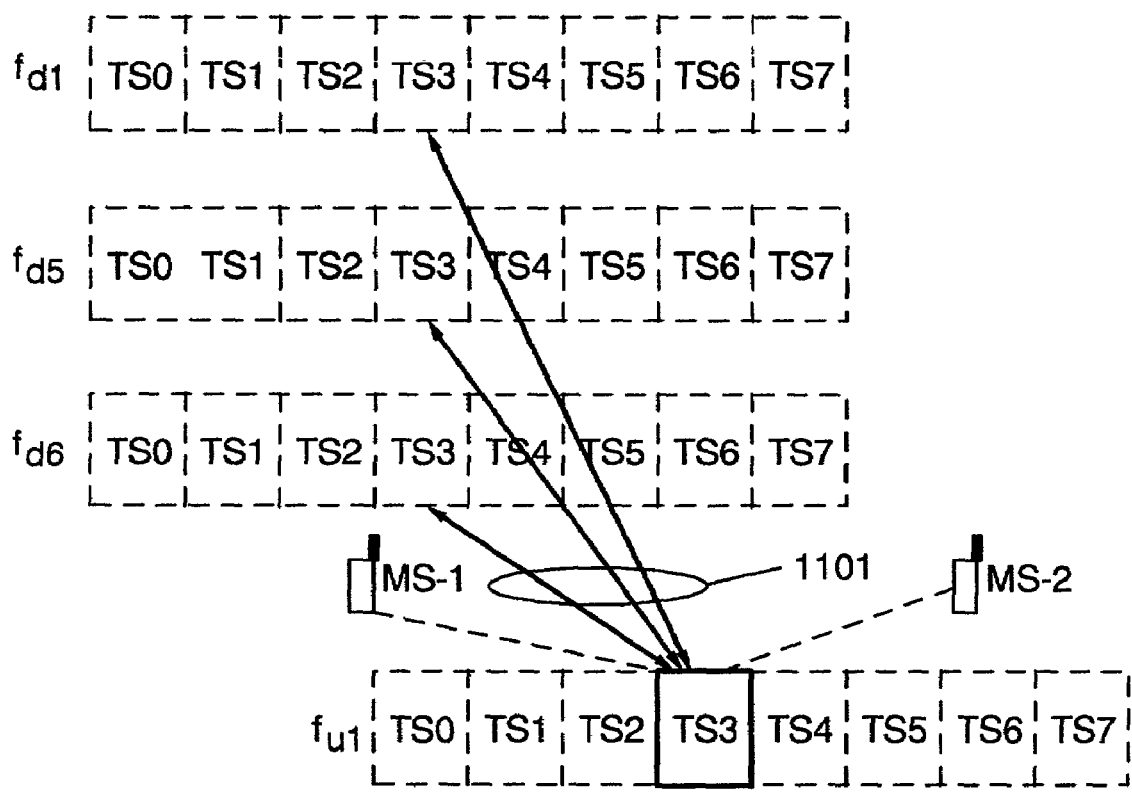
FIG. 11 further illustrates the relationship between uplink and downlink timeslots in a TDMA based system using dynamic access in which the present invention is in use.

In one embodiment, an association is created between the uplink timeslot, and the corresponding downlink timeslot on every downlink carrier associated with the uplink carrier. In this example, every uplink timeslot is associated with the timeslot that has the same number on each of the three downlink frequencies, as shown at 1101 of FIG. 11. In this case, we denote timeslots by TSn, where n=0,1,2, . . . ,7. The uplink timeslot and the three associated downlink timeslots are denoted, TSn($f_{u1}$), TSn($f_{d1}$), TSn($f_{d5}$) and TSn($fd_6$), respectively, where n=0,1,2, . . . ,7. In this embodiment, the ability to still use dynamic access within the context of the asymmetric frequency allocation is based upon this extended fixed uplink/downlink relationship.

The second sub-process starts at step 904 where the BSS determines whether or not any mobile station shall gain access to transmit on the assigned uplink slot in the next block period. If so, the BSS determines whether or not asymmetric resource allocation is in effect at step 905. Asymmetric resource allocation exists whenever any given uplink slot has been assigned such that it has a corresponding downlink slot on more than one downlink frequency (i.e. different MS's have been told to read USF on different downlink frequencies in order to access the same uplink timeslot on the same uplink frequency). If asymmetric resource allocation is in effect the BSS sends the USF allocated to the target MS (i.e. the MS that the BSS wants to assign the uplink timeslot to) on the corresponding downlink timeslot of all downlink frequencies associated with the uplink frequency at step 906.

If, however, asymmetric allocation of resources is not in effect, as determined at step 905, the BSS sends the USF value of the MS on the single downlink timeslot associated with the uplink timeslot on the single associated downlink carrier at step 910. The sub-process then moves to 907 where it is determined whether or not the scheduling for the assigned uplink timeslot can be stopped, i.e. when all mobile stations assigned to the uplink timeslot have finished transmission. If so, the sub-process ends at step 908, otherwise the sub-process moves back from 907 to schedule the next MS. Referring again to FIG. 11, the network sends the assigned USF on TS3($f_{d1}$), TS3($f_{d5}$), and TS3($f_{d6}$) in order to control which mobile station is permitted to transmit in the next block period on TS3($f_{u1}$). For the typical application envisioned by this invention, a given mobile station will only be assigned a single asymmetric duplex carrier (i.e. one downlink frequency and one uplink frequency). However, when multiple mobile stations are allocated the same timeslot on different downlink frequencies (one downlink frequency per mobile station) where each mobile station is also allocated the same uplink timeslot on the same uplink frequency, the system must be careful to coordinate USF assignments such that the USF value allocated to each mobile station is unique for that downlink timeslot on all downlink frequencies sharing the same uplink frequency. This ensures that the USF value sent on the allocated downlink timeslot within any of the downlink frequencies sharing the same uplink frequency, will be able to uniquely grant access to a single mobile station on the corresponding uplink timeslot on the common uplink frequency.

Note that for the typical application envisioned by this invention, any given mobile station will only be required to receive on one downlink frequency and transmit on one uplink frequency. The MS may, however, be allocated more than one timeslot on any given downlink frequency with either no uplink timeslot allocation or an uplink timeslot allocation that does not necessarily correspond to any of the allocated downlink timeslots. For the case where one or more downlink timeslots have been allocated and no uplink timeslots have been allocated to an MS, the USF sent in the allocated downlink timeslots will have no meaning to the MS. USF sent in any given downlink slot on any given downlink frequency therefore only has meaning to an MS when the BSS has assigned it an uplink timeslot that is associated with that specific instance of USF.

FIG. 10 shows the invention as applied to an MS that supports the asymmetric allocation according to the invention. At 1001, the MS sends a request for transmitting packet data to the BSS. The MS receives an uplink timeslot assignment from the BSS including a USF value at 1002. The MS then reads the USF value sent on the downlink timeslot associated with the uplink timeslot at step 1003. At step 1004, the MS determines whether or not the USF value read at step 1003 matches the one assigned to it. If so, the MS transmits a packet in the next block period on the assigned uplink timeslot at step 1005. If, however, there is no match of the USF values, as determined in 1004, then the MS loops back to step 1003 to read the next USF sent from the BSS. At step 1006, after transmitting a packet, the MS determines whether or not it has more packet data to send. If there is more packet data to send, the MS loops back to 1003 to read the next USF value, otherwise, the MS releases the connection and ends the process. In this example of the present invention, an MS that is assigned an uplink timeslot using this extended fixed uplink/downlink relationship, only needs to monitor the USF sent in the corresponding downlink timeslot on the downlink frequency that the BSS has indicated as being the associated downlink frequency.

The dynamic access method described so far is based purely on the fixed relationship between uplink and downlink timeslots. Other embodiments or combinations of embodiments are possible. For example, the timeslot where the USF controlling access to an uplink slot is sent can always be co-located with one or more downlink slots also assigned to the same mobile station. This approach minimizes the number of downlink slots a mobile station will have to read for acquiring both a flag value and downlink packet data payload information. The mobile stations, by standard agreement, can engage in a resource allocation process to determine the downlink frequency and timeslot to read USF from for any allocated uplink timeslot. Finally, also by standard agreement, the mobile stations can always look for the USF on a carrier with a specific duplex distance that is always present, for example, in GSM, the so-called "classic" carrier downlink frequency.

In some embodiments, the packet channel operations just described are performed by the same software and hardware previously described with reference to the asymmetric frequency allocation. The invention may be embodied in hardware and/or in software (including firmware, resident software, micro-code, etc.). Furthermore, the invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

We have described herein, specific embodiments of an invention. One of ordinary skill in the networking and computing arts will quickly recognize that the invention has other applications in other environments. In fact, many embodiments and implementations are possible. In addition, the recitation "means for" is intended to evoke a means-plus-function reading of an element in a claim, whereas, any elements that do not specifically use the recitation "means for," are not intended to be read as means-plus-function elements, even if they otherwise include the word "means." The following claims are in no way intended to limit the scope of the invention to the specific embodiments described.

We claim:

1. A method of signaling an individual mobile station to transmit in a frequency division duplex, time domain multiplexed access (TDMA) communication network for use by a plurality of mobile stations, wherein asymmetric frequency allocation provides for multiple downlink frequencies associated with one uplink frequency, the method comprising:

assigning timeslots to the individual mobile station on at least one asymmetric, duplex carrier including the uplink frequency and at least one downlink frequency from among the multiple downlink frequencies so that the individual mobile station from among the plurality of mobile stations can use any of the downlink frequencies with the one uplink frequency to provide greater capacity for downlink traffic in the frequency division duplex, TDMA communication network;

assigning a flag value to the individual mobile station; and transmitting the flag value on at least one of the multiple downlink frequencies to indicate readiness to receive a signal from the individual mobile station on the uplink frequency.

2. The method of claim 1 wherein transmitting the flag value is accomplished by transmitting the flag value on a plurality of the multiple downlink frequencies.

3. The method of claim 1 wherein transmitting the flag value is accomplished by transmitting the flag value on all of the multiple downlink frequencies.

4. A method of signaling a base station system in a frequency division duplex, time domain multiplexed access (TDMA) communication network wherein asymmetric frequency allocation provides for multiple downlink frequencies associated with one uplink frequency to provide greater capacity for downlink traffic, the method comprising:
   receiving from the base station system an assignment of timeslots from among multiple timeslots assigned to multiple mobile stations operating within the frequency division duplex, TDMA communication network on an asymmetric duplex carrier including the uplink frequency and any of the multiple downlink frequencies;
   receiving a notification of an assigned flag value from the base station system;
   receiving the flag value on at least one of the downlink frequencies indicating availability of the base station system to receive a signal on the uplink frequency; and
   transmitting the signal on the uplink frequency.

5. Apparatus for signaling an individual mobile station to transmit in a frequency division duplex, time domain multiplexed access (TDMA) communication network for use a plurality of mobile stations, wherein asymmetric frequency allocation provides for multiple downlink frequencies associated with one uplink frequency, the apparatus comprising:
   means for assigning timeslots to the individual mobile station on at least one asymmetric, duplex carrier including the uplink frequency and at least one downlink frequency from among the multiple downlink frequencies so that the individual mobile station from among the plurality of mobile stations can use any of the downlink frequencies with the one uplink frequency to provide greater capacity for downlink traffic in the frequency division duplex, TDMA communication network;
   means for assigning a flag value to the individual mobile station; and
   means for transmitting the flag value on at least one of the multiple downlink frequencies to indicate readiness to receive a signal from the individual mobile station on the uplink frequency.

6. Apparatus for signaling a base station system in a frequency division duplex, time domain multiplexed access (TDMA) communication network wherein asymmetric frequency allocation provides for multiple downlink frequencies associated with one uplink frequency to provide greater capacity for downlink traffic, the apparatus comprising:
   means for receiving from the base station system an assignment of timeslots from among multiple timeslots assigned to multiple mobile stations operating within the frequency division duplex, TDMA communication network on an asymmetric duplex carrier including the uplink frequency and any of the multiple downlink frequencies;
   means for receiving a notification of an assigned flag value from the base station system;
   means for receiving the flag value on at least one of the downlink frequencies indicating availability of the base station system to receive a signal on the uplink frequency; and
   means for transmitting the signal on the uplink frequency.

7. A computer program product for enabling a base station system to signal an individual mobile station to transmit in a frequency division duplex, time domain multiplexed access (TDMA) communication network for use a plurality of mobile stations, wherein asymmetric frequency allocation provides for multiple downlink frequencies associated with one uplink frequency, the computer program product comprising a computer program further comprising:
   instructions for assigning timeslots to the individual mobile station on at least one asymmetric, duplex carrier including the uplink frequency and at least one downlink frequency from among the multiple downlink frequencies so that the individual mobile station from among the plurality of mobile stations can use any of the downlink frequencies with the one uplink frequency to provide greater capacity for downlink traffic in the frequency division duplex, TDMA communication network;
   instructions for assigning a flag value to the individual mobile station; and
   instructions for transmitting the flag value on at least one of the multiple downlink frequencies to indicate readiness to receive a signal from the individual mobile station on the uplink frequency.

8. The computer program product of claim 7 wherein transmitting the flag value is accomplished by transmitting the flag value on a plurality of the multiple downlink frequencies.

9. The computer program product of claim 7 wherein transmitting the flag value is accomplished by transmitting the flag value on all of the multiple downlink frequencies.

10. A mobile station for use in a frequency division duplex, time domain multiplexed access (TDMA) communication network, wherein asymmetric frequency allocation provides for multiple downlink frequencies associated with one uplink frequency to provide greater capacity for downlink traffic, the mobile station comprising:
    radio circuitry operable to transmit and receive frequency division duplex radio frequency (RF) signals;
    logic connected to the radio circuitry;
    a processor system operatively connected to the logic and controlling the logic and the radio circuitry, the processor system and logic enabling the mobile station to signal a base station system by performing a method further comprising:
    receiving from the base station system an assignment of timeslots from among multiple timeslots assigned to multiple mobile stations operating within the frequency division duplex TDMA communication network on at least one asymmetric duplex carrier including the uplink frequency and any of the multiple downlink frequencies;
    receiving a notification of an assigned flag value from the base station system;
    receiving the flag value on at least one of the downlink frequencies indicating availability of the base station system to receive a signal on the uplink frequency; and
    transmitting the signal on the uplink frequency.

11. Apparatus enabled by at least one processor to signal an individual mobile station to transmit in a frequency division duplex, time domain multiplexed access (TDMA)

communication network for use a plurality of mobile stations, wherein asymmetric frequency allocation provides for multiple downlink frequencies associated with one uplink frequency, the processor programmed to:

assign timeslots to the individual mobile station on at least one asymmetric, duplex carrier including the uplink frequency and at least one downlink frequency from among the multiple downlink frequencies so that the individual mobile station from among the plurality of mobile stations can use any of the downlink frequencies with the one uplink frequency to provide greater capacity for downlink traffic in the frequency division duplex, TDMA communication network;

assign a flag value to the individual mobile station; and transmit the flag value on at least one of the multiple downlink frequencies to indicate readiness to receive a signal from the individual mobile station on the uplink frequency.

12. The apparatus of claim 11 wherein transmitting the flag value is accomplished by transmitting the flag value on a plurality of the multiple downlink frequencies.

13. The apparatus of claim 11 wherein transmitting the flag value is accomplished by transmitting the flag value on all of the multiple downlink frequencies.

* * * * *